United States Patent
Senoo

(10) Patent No.: US 9,091,600 B2
(45) Date of Patent: Jul. 28, 2015

(54) TEMPERATURE ESTIMATION APPARATUS FOR ESTIMATING TEMPERATURE OF MOTOR

(71) Applicant: FANUC CORPORATION, Yamanashi (JP)

(72) Inventor: Tatsuya Senoo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 107 days.

(21) Appl. No.: 14/055,045

(22) Filed: Oct. 16, 2013

(65) Prior Publication Data
US 2014/0112369 A1 Apr. 24, 2014

(30) Foreign Application Priority Data
Oct. 18, 2012 (JP) .................. 2012-231007

(51) Int. Cl.
*G01K 3/00* (2006.01)
*G01K 7/00* (2006.01)
*G01K 7/42* (2006.01)
*G01K 7/22* (2006.01)
*H02H 7/085* (2006.01)
*G01K 3/04* (2006.01)

(52) U.S. Cl.
CPC .. *G01K 7/42* (2013.01); *G01K 7/22* (2013.01); *G01K 3/04* (2013.01); *G01K 2205/00* (2013.01)

(58) Field of Classification Search
CPC ........ G01K 7/42; G01K 7/22; G01K 2205/00; G01K 3/04

USPC .................. 374/102–103; 318/471, 473
See application file for complete search history.

(56) References Cited

U.S. PATENT DOCUMENTS

| 6,128,948 | A * | 10/2000 | Shi et al. ............... 73/114.68 |
| 8,770,834 | B2 * | 7/2014 | Suzuki .............................. 374/1 |
| 8,975,851 | B2 * | 3/2015 | Usami et al. .................. 318/473 |
| 8,975,852 | B2 * | 3/2015 | Petersson et al. ............. 318/490 |
| 2003/0071594 | A1 * | 4/2003 | Kleinau et al. ............... 318/567 |
| 2003/0076061 | A1 * | 4/2003 | Kleinau et al. ............... 318/432 |
| 2003/0076064 | A1 * | 4/2003 | Kleinau et al. ............... 318/567 |
| 2003/0076065 | A1 * | 4/2003 | Shafer et al. ................. 318/567 |

(Continued)

FOREIGN PATENT DOCUMENTS

JP 09093795 A 4/1997

*Primary Examiner* — Lisa Caputo
*Assistant Examiner* — Jonathan Dunlap
(74) *Attorney, Agent, or Firm* — Fredrikson & Byron, P.A.

(57) ABSTRACT

A coefficient value acquiring unit acquires values of coefficients C and K representing a relationship among a heat generation amount of a motor generated due to a loss $Q_1(t)$ of the motor, a temperature variation amount of the motor, and a placement position of a temperature detection device, using the loss $Q_1(t)$ of the motor, a detection temperature $T_d(t)$, and an ambient temperature $T_a$ of the motor. The temperature estimating unit estimates a temperature $T_e(t)$ of the motor based on the values of the coefficients C and K, a preset reference value $C_m$ of the coefficient C, a preset reference value $K_m$ of the coefficient K, the detection temperature $T_d(t)$, and the ambient temperature $T_a$ of the motor.

3 Claims, 2 Drawing Sheets

(56) References Cited

U.S. PATENT DOCUMENTS

| | | | |
|---|---|---|---|
| 2005/0092105 A1* | 5/2005 | Feick | 73/862.08 |
| 2012/0226483 A1* | 9/2012 | Berry et al. | 703/2 |
| 2012/0249039 A1* | 10/2012 | Usami et al. | 318/490 |
| 2013/0069579 A1* | 3/2013 | Uematsu et al. | 318/473 |
| 2014/0126607 A1* | 5/2014 | Oya et al. | 374/163 |
| 2014/0161152 A1* | 6/2014 | Kuhn | 374/152 |

\* cited by examiner

TEMPERATURE ESTIMATION APPARATUS FOR ESTIMATING TEMPERATURE OF MOTOR

BACKGROUND OF THE INVENTION

1. Field of the Invention

The present invention relates to a temperature estimation apparatus for estimating temperature of a motor.

2. Description of the Related Art

Conventionally, a temperature estimation apparatus for estimating motor temperature has been proposed to determine whether or not a motor has overheated. Such a temperature estimation apparatus either estimates motor temperature based on a detection temperature detected by a temperature detection device, or estimates motor temperature based on a motor loss which is sequentially calculated, or performs both estimations.

When motor temperature is estimated based on temperature detected by the temperature detection device, the temperature detection device is disposed in a vicinity of a winding wire (a heat generation source) provided in the motor and then the detection temperature detected by the temperature detection device is estimated as the temperature of the motor.

On the other hand, as described in Unexamined Japanese Patent Publication (Kokai) No. 9-93795, when a temperature of a motor is estimated based on a motor loss, a current passing through the motor is sequentially acquired in each preset sampling period (250 microseconds, for example); a motor loss is sequentially calculated from the current sequentially acquired; and then the temperature of the motor is estimated from the loss sequentially calculated.

Even if a temperature detection device is disposed in a vicinity of a winding wire during production of motors, it is impossible to place the temperature detection device in the same position for all motors having the same shape and made of the same material. Accordingly, placement of the temperature detection device is different for each motor. Such a difference in placement of the temperature detection device causes a detection temperature detected by the temperature detection device to vary even when the amount of heat generated is the same. Such variation in the detection temperature increases in accordance with an increase in a temperature gradient of a periphery of the position of the temperature detection device. For example, when a coolant filling unit of a cooling system is disposed on an exterior side of a motor, the coolant filling unit is disposed in a vicinity of a winding wire in order to enhance a cooling effect. Therefore, when amounts of heat generation of motors are the same, a detection temperature detected by a temperature detection device decreases as the shortest distance between a placement position of the temperature detection device and the coolant filling unit becomes shorter. Therefore, a timing for outputting an alarm for overheat protection is delayed as the shortest distance between the placement position of the temperature detection device and the coolant filling unit becomes shorter. Accordingly, an influence on variation in the detection temperature detected by the temperature detection device due to the difference in the placement position of the temperature detection device for each motor causes a difference in an estimated temperature for each motor. Therefore, it is impossible to accurately estimate the temperature of the motor in order to determine whether or not the motor is overheated.

On the other hand, when a temperature of a motor is estimated based on a motor loss which is sequentially calculated, a current is sequentially acquired in each sampling period to sequentially calculate a motor loss. As a result, a variation of the loss of the motor increases as a variation between a current value acquired in a certain sampling period and a current value acquired in the subsequent sampling period becomes larger. Further, a variation of an estimated temperature increases as a variation of the motor loss becomes larger. Therefore, a variation of current passing through the motor affects a variation in an estimated temperature of the motor, resulting in a disadvantage that it is impossible to accurately estimate the temperature of the motor in order to determine whether or not the motor is overheated.

SUMMARY OF THE INVENTION

An object of the present invention is to provide a temperature estimation apparatus which is capable of estimating motor temperature without being affected by a variation of a detection temperature detected by a temperature detection device due to a difference in placement of the temperature detection device for each motor and a variation in a current passing through the motor.

The temperature estimation apparatus includes a loss calculating unit for calculating, in a preset period of time, a motor loss; a detection temperature acquiring unit for sequentially acquiring a detection temperature detected by a temperature detection device disposed in the motor in each preset sampling period over a preset period of time; a coefficient value acquiring unit for acquiring a value of a coefficient representing a relationship among a heat generation amount of the motor generated due to the loss, a temperature variation amount of the motor, and a placement position of the temperature detection device, by using the loss calculated by the loss calculating unit, the detection temperature acquired by the detection temperature acquiring unit, and an ambient temperature of the motor; and a temperature estimating unit for estimating a temperature of the motor based on the value of the coefficient, a preset reference value of the coefficient, the detection temperature, and the ambient temperature of the motor.

Preferably, the detection temperature acquiring unit acquires a detection temperature detected by the temperature detection device disposed in a motor including a cooling system.

Preferably, the detection temperature acquiring unit acquires a detection temperature detected by the temperature detection device disposed in a vicinity of a winding wire provided in a motor.

BRIEF DESCRIPTION OF THE DRAWINGS

The present invention will be more clearly understood with reference to the following accompanying drawings.

DETAILED DESCRIPTION

With reference to the drawings, a temperature estimation apparatus for estimating a temperature of a motor will be described. However, it should be understood that the present invention is not limited to the drawings and embodiments to be described below.

Figure 1:
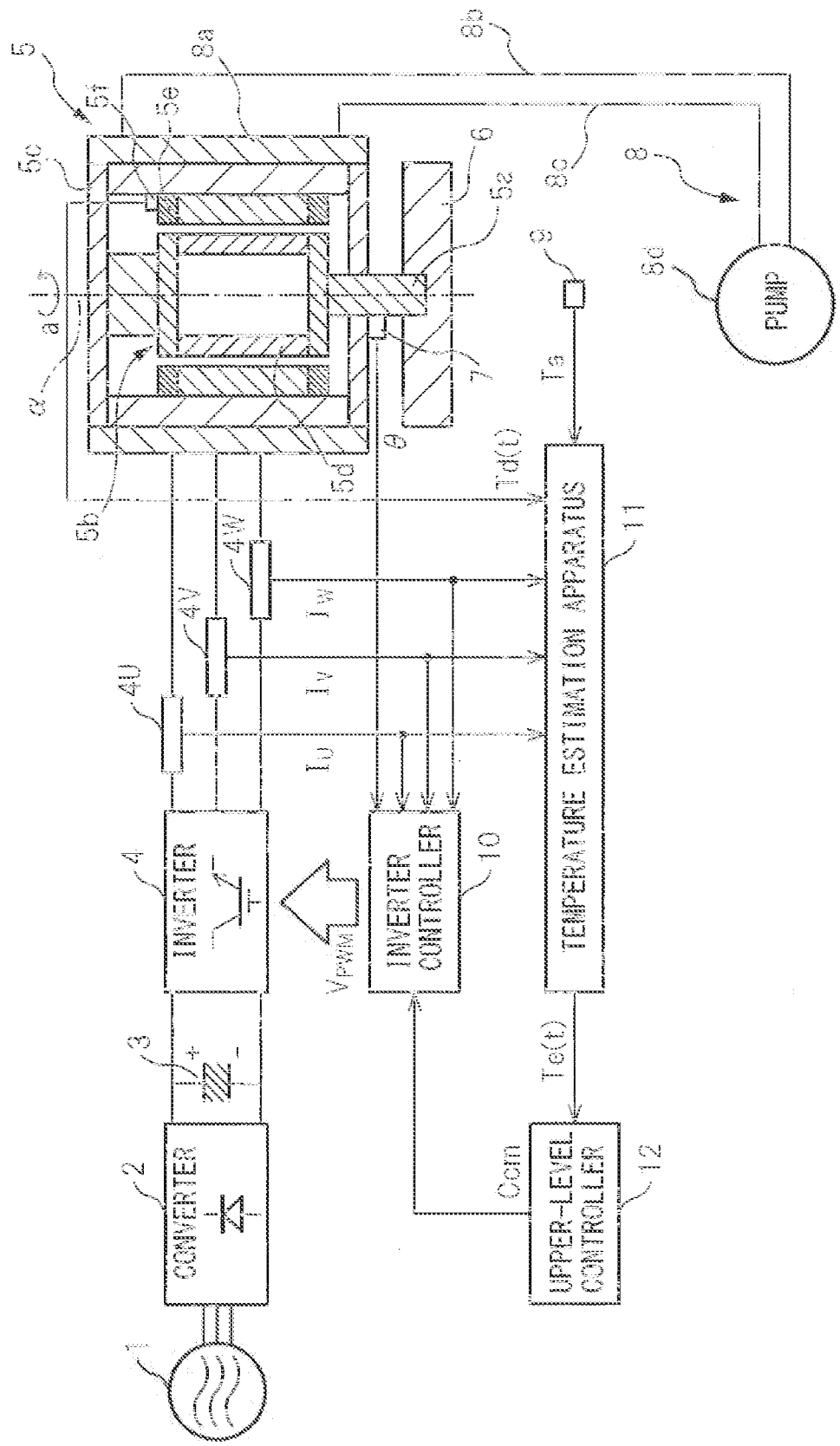
FIG. 1 is a block diagram of a system applied with a temperature estimation apparatus.

FIG. 1 is a block diagram of a system applied with a temperature estimation apparatus. The system illustrated in FIG. 1 is used in machine tools, robots, and the like and includes a three-phase AC power source 1, a converter 2, a smoothing capacitor 3, an inverter 4, current detectors 4U, 4V, and 4W, a rotary permanent magnet synchronous motor 5 as a motor, a driven body 6, a rotational angle detector 7, a cooling system 8, a temperature detection device 9, an inverter controller 10, a temperature estimation apparatus 11, and a upper-level controller 12. In FIG. 1, for clarification, the rotary permanent magnet synchronous motor 5, the driven body 6, and a part of the cooling system 8 are cross-sectionally illustrated.

The converter 2 includes, for example, a plurality (six in the case of three-phase AC) of rectifying diodes and converts AC power supplied from a three-phase AC power source 1 into DC power. The smoothing capacitor 3 is connected in parallel to the converter 2 to smooth a voltage rectified by the rectifying diodes of the converter 2. The inverter 4 is connected in parallel to the smoothing capacitor 3 and includes, for example, a plurality (six in the case of three-phase AC) of transistors. The inverter 4 performs on/off operation of the transistors based on a PWM signal $V_{PWM}$ to be described later to convert DC power converted by the converter 2 into AC power. The current detectors 4U, 4V, and 4W each include, for example, a Hall element and are provided on output lines of the inverter 4 to detect current values of U-phase current $I_U$, V-phase current $I_V$, and W-phase current $I_W$ of three-phase, respectively.

The rotary permanent magnet synchronous motor 5 is driven by electric power stored in the smoothing capacitor 3 and includes a rotor 5b having a rotary shaft 5 and a stator 5c disposed so as to surround the rotor 5b. The rotor 5b includes a permanent magnet 5d. The stator 5c includes a winding wire 5e supplied with U-phase current $I_U$, V-phase current $I_V$, and W-phase current $I_W$. Therefore, the rotary permanent magnet synchronous motor 5 functions as a three-phase synchronous motor. In the present embodiment, the rotary shaft 5a rotates in a counterclockwise direction a with respect to a shaft line α. Further, in the present embodiment, a temperature detection device 5f is disposed in a vicinity of the winding wire 5e serving as a heat generation source. The temperature detection device 5f includes any one of a thermistor and a thermostat and detects a detection temperature $T_d(t)$ corresponding to a temperature of the winding wire 5e.

The rotational angle detector 7 includes a rotary encoder and is attached to the rotary shaft 5a to detect a rotational angle θ of the rotary shaft 5a. The cooling system 8 includes a coolant filling unit 8a, coolant flow paths 8b and 8c, and a pump 8d. The coolant filling unit 8a is disposed on an exterior side of the stator 5b so as to be close to the winding wire 5e. The coolant filling unit 8a is filled with a coolant (water, for example) to cool the rotary permanent magnet synchronous motor 5. The coolant flow path 8b causes the coolant to flow in the coolant filling unit 8a and then the coolant from the coolant filling unit 8a flows in the coolant flow path 8c. The pump 8d circulates the coolant through the coolant flow path 8b, the coolant filling unit 8a, and the coolant flow path 8c. The temperature detection device 9 includes any one of a thermistor and a thermostat and is disposed around the rotary permanent magnet synchronous motor 5 to detect an ambient temperature $T_a$ of the rotary permanent magnet synchronous motor 5.

The inverter controller 10 samples respective current values of U-phase current $I_U$, V-phase current $I_V$, and W-phase current $I_W$ as each current value data of the rotary permanent magnet synchronous motor 5 and a rotational angle θ as a position or velocity data of the motor, in order to control the inverter 4.

Then, the inverter controller 10 generates a PWM signal $V_{PWM}$ for driving the rotary permanent magnet synchronous motor 5 based on the sampled current value data, the sampled position or velocity data of the motor, and a position or velocity command Com of the motor to be described later.

The temperature estimation apparatus 11 is realized by a processor including an input/output port, a serial communication circuit, an A/D converter, a comparator, and the like. The temperature estimation apparatus 11 executes processing for estimating temperature $T_e(t)$ of the rotary permanent magnet synchronous motor 5 to perform such as a determination whether the motor is overheated in accordance with a processing program stored in a memory, not illustrated. The upper-level controller 12 includes a CNC (numerical controller) and inputs the position or velocity command Com of the motor, as described above, to the inverter controller 10.

Figure 2:
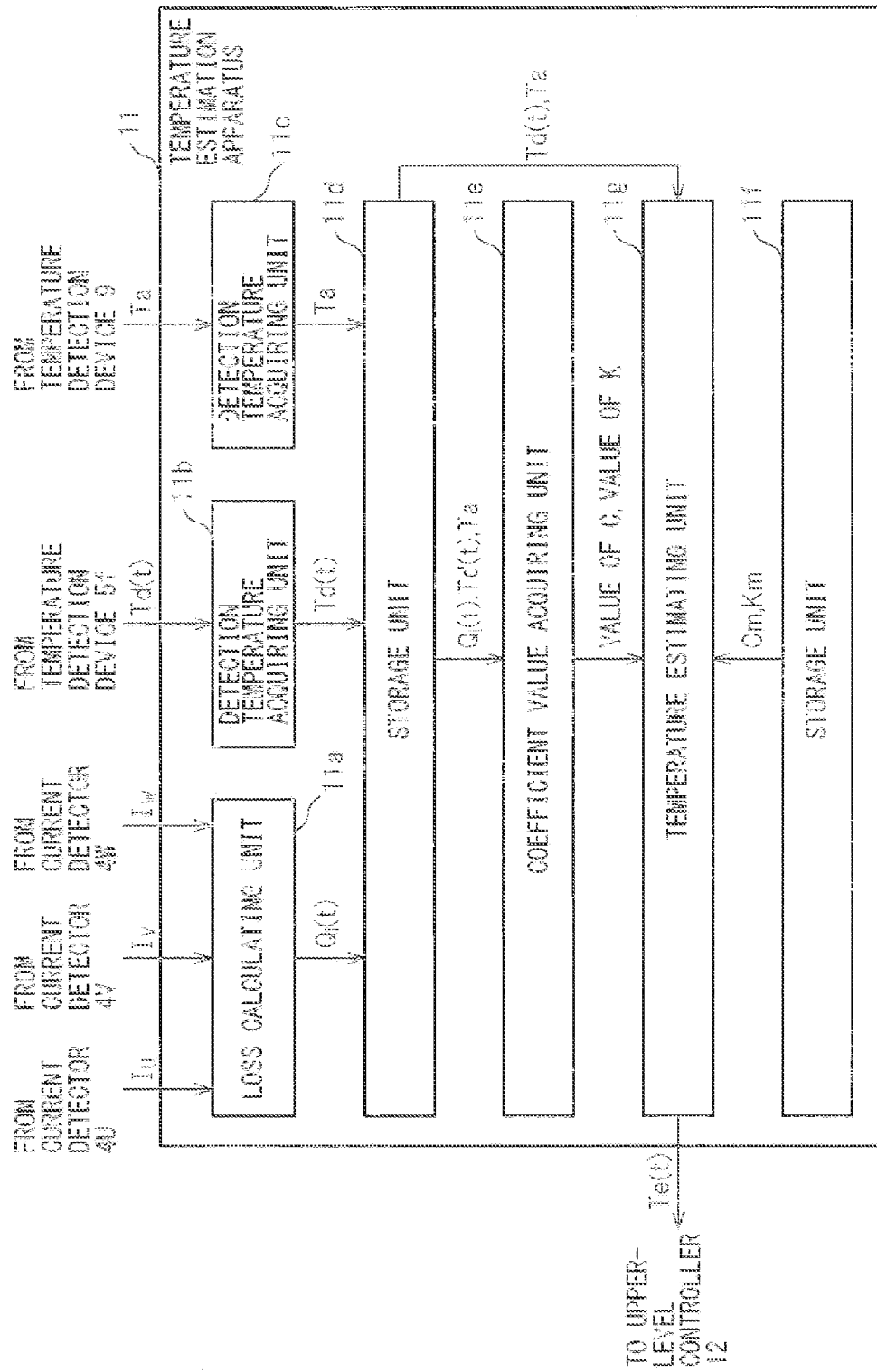
FIG. 2 is a block diagram of the temperature estimation apparatus of FIG. 1.

FIG. 2 is a block diagram of the temperature estimation apparatus of FIG. 1. The temperature estimation apparatus 11 includes a loss calculating unit 11a, a first detection temperature acquiring unit 11b, a second detection temperature acquiring unit 11c, a first storage unit 11d, a coefficient value acquiring unit 11e, a second storage unit 11f, and a temperature estimating unit 11g in order to estimate temperature $T_e(t)$.

The loss calculating unit 11a calculates a loss $Q_1(t)$ corresponding to a copper loss of the motor in each preset sampling period Δt over a preset period of time (1000 seconds, for example). Therefore, the loss calculating unit 11a acquires respective current values of U-phase current $I_U$, V-phase current $I_V$, and W-phase current $I_W$ of three-phase in each preset sampling period Δt over a preset period of time (1000 seconds, for example) and then calculates the loss $Q_1(t)$ based on these current values. Then, the loss calculating unit 11a outputs the calculated loss $Q_1(t)$ to the storage unit 11d. Herein, the sampling period Δt corresponds to one clock period (250 microseconds, for example) of a clock signal output by a clock (not illustrated) incorporated in the temperature estimation apparatus 11 to each unit of the temperature estimation apparatus 11.

The detection temperature acquiring unit 11b sequentially acquires a detection temperature $T_d(t)$ detected by the temperature detection device 5f in each preset sampling period Δt over a preset period of time (1000 seconds, for example) and then sequentially outputs the acquired detection temperature $T_d(t)$ to the storage unit 11d.

The detection temperature acquiring unit 11c acquires an ambient temperature $T_a$ detected by the temperature detection device 9 only once in a preset period of time (1000 seconds, for example) and then outputs the acquired ambient temperature $T_a$ to the storage unit 11d.

The storage unit 1id temporarily stores the loss $Q_1(t)$, the detection temperature $T_d(t)$, and the ambient temperature $T_a$. Then, the storage unit 11d outputs the loss $Q_1(t)$, the detection temperature $T_d(t)$, and the ambient temperature $T_a$ to the coefficient value acquiring unit 11e when the coefficient value acquiring unit 11e acquires respective values of coefficients C and K to be described later. The storage unit 11d outputs the detection temperature $T_d(t)$ and the ambient temperature $T_a$ to the temperature estimating unit 11g when the temperature estimating unit 11g estimates temperature $T_e(t)$ of the rotary permanent magnet synchronous motor 5.

The coefficient value acquiring unit 11e acquires values of coefficients C and K representing a relationship among a heat generation amount of the rotary permanent magnet synchronous motor 5 generated due to the loss $Q_1(t)$ of the rotary permanent magnet synchronous motor 5, a temperature variation amount of the rotary permanent magnet synchronous motor 5, and a placement position of the temperature detection device 5f using the loss $Q_1(t)$, the detection temperature $T_d(t)$, and the ambient temperature $T_a$. Therefore, the coefficient value acquiring unit 11e specifies respective values of the coefficients C and K by substituting the loss $Q_1(t)$, the detection temperature $T_d(t)$, and the ambient temperature $T_a$ into the following formula representing a thermal model and using a least-square method and the like:

$$T_d(t + \Delta t) = T_d(t) + \frac{Q_1(t) - K(T_d(t) - T_a)}{C} \Delta t \quad (1)$$

wherein t represents a time in a preset period of time, $\Delta t$ represents a sampling period, $T_d(t)$ is a temperature detected by a temperature detection device in a vicinity of a winding wire at the time t, $T_d(t+\Delta t)$ is temperature detected by the temperature detection device in the vicinity of the winding wire at a time t+$\Delta t$, $Q_1(t)$ is a loss of a motor at the time t, $T_a$ is an ambient temperature of the motor at an optional time in the preset period of time, and C and K are coefficients representing a relationship among a heat generation amount of the motor generated due to the loss of the motor, a temperature variation amount of the motor, and a placement position of the temperature detection device. Herein, the coefficients C and K each are determined according to a shape and material of the rotary permanent magnet synchronous motor 5 and cooling conditions of the stator 5c. When the values of coefficients C and K are specified, the detection temperature $T_d(t)$ is used in addition to the loss $Q_1(t)$. Therefore, a variation of the loss $Q_1(t)$ resulting from a variation of a current value is compensated by the detection temperature $T_d(t)$ which is actually detected by the temperature detection device 5f.

The storage unit 11f stores a preset reference value $C_m$ of the coefficient C and a preset reference value $K_m$ of the coefficient K. Then, the storage unit 11f outputs the preset reference value $C_m$ of the coefficient C and the preset reference value $K_m$ of the coefficient K to the temperature estimating unit 11g when the temperature estimating unit 11g estimates temperature $T_e(t)$ of the rotary permanent magnet synchronous motor 5. Herein, the preset reference value $C_m$ of the coefficient C and the preset reference value $K_m$ of the coefficient K are preset, for example, by specifying respective values of the coefficients C and K of formula (1) with respect to an individual body (a rotary permanent magnet synchronous motor) serving as a master of the rotary permanent magnet synchronous motor 5, followed by setting the specified coefficients C and K as the preset reference value $C_m$ of the coefficient C and the preset reference value $K_m$ of the coefficient K, respectively.

The temperature estimating unit 11g estimates temperature $T_e(t)$ of the rotary permanent magnet synchronous motor 5 based on the values of the coefficients C and K, the preset reference value $C_m$ of the coefficient C, the present reference value $K_m$ of the coefficient K, the detection temperature $T_d(t)$, and the ambient temperature $T_a$. Then, the temperature estimating unit 11g outputs the estimated temperature $T_e(t)$ to the upper-level controller 12.

Herein, among the estimated temperature $T_e(t)$, the loss $Q_1(t)$, the ambient temperature $T_a$, the preset reference value $C_m$ of the coefficient C, and the preset reference value $K_m$ of the coefficient K, a relationship expressed by the following formula representing a thermal model is established in the same manner as in formula (1):

$$T_e(t + \Delta t) = T_e(t) + \frac{Q_1(t) - K_m(T_e(t) - T_a)}{C_m} \Delta t \quad (2)$$

wherein t represents a time in a preset period of time, $\Delta t$ represents a sampling period, $T_e(t)$ is an estimated temperature of a motor at the time t, $T_e(t+\Delta t)$ is an estimated temperature of the motor at a time t+$\Delta t$, $Q_1(t)$ is a loss of the motor at the time t, $T_a$ is an ambient temperature of the motor at an optional time in the preset period of time, $C_m$ is a preset reference value of a coefficient C, and $K_m$ is a preset reference value of a coefficient K. When the loss $Q_1(t)$ is eliminated by subtracting formula (1) from formula (2) and thereby the estimation temperature $T_e(t+\Delta t)$ is determined, it is possible to establish the following recurrence formula:

$$T_e(t + \Delta t) = \\ \{T_d(t + \Delta t) - T_d(t)\}\frac{C}{C_m} + \frac{KT_d(t) - K_m T_e(t) + (K_e - K)T_a}{C_m} \Delta t \quad (3)$$

wherein t represents a time in a preset period of time, $\Delta t$ represents a sampling period, $T_d(t)$ is a detection temperature detected by a temperature detection device in a vicinity of a winding wire at the time t, $T_d(t+\Delta t)$ is a detection temperature detected by the temperature detection device in the vicinity of the winding wire at a time t+$\Delta t$, $T_e(t)$ is an estimation temperature of a motor at the time t, $T_e(t+\Delta t)$ is an estimated temperature of the motor at the time t+$\Delta t$, C and K are coefficients representing a relationship among a heat generation amount of the motor generated due to the loss of the motor, a temperature variation amount of the motor, and a placement position of the temperature detection device, $C_m$ is a preset reference value of the coefficient C, and $K_m$ is a preset reference value of the coefficient K. In the present embodiment, by using recurrence formula (3), the temperature estimating unit 11g estimates temperature $T_e(t)$ based on the detection temperature $T_d(t)$, the detection temperature $T_d(t+\Delta t)$, the ambient temperature $T_a$, the coefficients C and K, the preset reference value $C_m$ of the coefficient C, and the preset reference value $K_m$ of the coefficient K. Herein, an initial value of the estimation temperature $T_e(t)$ is set as the ambient temperature $T_a$.

According to the present embodiment, the temperature estimating unit 11g estimates temperature $T_e(t)$ based on a detection temperature $T_d(t)$, a detection temperature $T_d(t+\Delta t)$, an ambient temperature $T_a$, coefficients C and K representing a relationship among a heat generation amount of a motor generated due to a loss of the motor, a temperature variation amount of the motor, and a placement position of a temperature detection device, a preset reference value $C_m$ of the coefficient C, and a preset reference value $K_m$ of the coefficient K. Accordingly, a variation of a detection temperature $T_d(t)$ is compensated, the detection temperature $T_d(t)$ being detected by the temperature detection device due to a difference in a placement position of the temperature detection device 5f for each rotary permanent magnet synchronous motor 5. Therefore, the temperature estimating unit 11g is able to estimate the temperature $T_e(t)$ without being affected by a variation of the detection temperature $T_d(t)$ detected by a temperature detection device due to a difference in a placement position of the temperature detection device 5f for each rotary permanent magnet synchronous motor 5. Further, according to the present embodiment, since the estimated temperature $T_e(t)$ becomes constant regardless of the placement position of the temperature detection device 5f, in other words, the detection temperature $T_d(t)$, an alarm for overheat protection of the rotary permanent magnet synchronous motor 5 is able to be output at an appropriate timing.

In addition, according to the present embodiment, the temperature estimating unit 11g does not use a loss $Q_1(t)$ when estimating temperature $T_e(t)$. Therefore, the temperature estimating unit 11g is able to estimate temperature $T_e(t)$ without being affected by a variation of the loss $Q_1(t)$ that increases due to an increase in variations of U-phase current $I_U$, V-phase current $I_V$, and W-phase current $I_W$.

The present invention is not limited to the embodiment, and numerous variations and modifications can be made. For example, as an AV power source, the three-phase AC power source 1 has been used herein, however, a multiphase AC power source other than the three-phase is usable as the power source. Further, a rotary permanent magnet synchronous motor including a permanent magnet in a stator, a direct-acting permanent magnet synchronous motor including a permanent magnet in any one of a stator and a movable element, or the like is usable as the motor.

It is possible for the rotational angle detector 7 to include a component other than a rotary encoder (a Hall element or resolver, for example). Further, it is possible to omit the rotational angle detector 7 and calculate a rotational angle θ based on an AC current and an AC voltage supplied to the rotary permanent magnet synchronous motor 5, instead.

In the embodiment, the case of using the current detectors 4U, 4V, and 4W has been described. However, any two of the current detectors 4U, 4V, and 4W are employable. Further, in the embodiment, the case of placing the temperature detection device 5f in a vicinity of the winding wire 5e has been described, however, it is possible for the temperature detection device 5f to be disposed at an arbitrary position in an interior or on a surface of the rotary permanent magnet synchronous motor 5. Further, in the embodiment, the case of placing the coolant filling unit 8a on an exterior side of the stator 5c has been described, however, it is possible for the coolant filling unit 8a to be disposed at an arbitrary position in an interior or on a surface of the rotary permanent magnet synchronous motor 5.

In the embodiment, the case of using the cooling system 8 of a water-cooling type for circulating a coolant has been described, however, an air-cooling-type cooling system including a fan is employable and the cooling system is also omittable. Further, the loss calculating unit may calculate, as a loss $Q_1(t)$, an iron loss, a copper loss, a mechanical loss, or an combination thereof at least once in a preset period of time. Furthermore, it is possible for the aforementioned preset period of time and sampling period Δt to be set appropriately according to a motor type.

Further, it is possible for the detection temperature acquiring unit 11c to sequentially acquire an ambient temperature $T_a(t)$ detected by the temperature detection device 9 in each preset sampling period Δt over a preset period of time (1000 seconds, for example) and sequentially output the acquired ambient temperature $T_a(t)$ to the storage unit 11d. Furthermore, it is possible to omit the temperature detection device 9 and preset an ambient temperature $T_a$ which is determined according to a placement position of the rotary permanent magnet synchronous motor 5.

In addition, the coefficient value acquiring unit 11e is able to acquire a value of a coefficient representing a relationship among a heat generation amount of the rotary permanent magnet synchronous motor 5 generated due to a loss $Q_1(t)$ of the rotary permanent magnet synchronous motor 5, a temperature variation amount of the rotary permanent magnet synchronous motor 5, and a placement position of the temperature detection device 5f, using a formula other than formula (1) (for example, an approximation formula established based on a relationship among a loss and a temperature actually measured and a placement position of the temperature detection device).

According to the present invention, it is possible to estimate a temperature of a motor without being affected by a variation of a detection temperature detected by a temperature detection device due to a difference in a placement of the temperature detection device in each motor and a variation of a current passing through the motor.

What is claimed is:

1. A temperature estimation apparatus comprising:
   a loss calculating unit for calculating, in a preset period of time, a loss of a motor;
   a detection temperature acquiring unit for sequentially acquiring a detection temperature detected by a temperature detection device disposed in the motor which varies due to a difference in placement of the temperature detection device, in each preset sampling period over the preset period of time;
   a coefficient value acquiring unit for acquiring a value of a coefficient which corresponds to a relationship among a heat generation amount of the motor generated due to the loss, a temperature variation amount of the motor, and a placement position of the temperature detection device, by using the loss calculated by the loss calculating unit, the detection temperature acquired by the detection temperature acquiring unit, and an ambient temperature of the motor;
   a storage unit for storing a heat generation amount of an individual body of the motor, a temperature variation amount of the motor, and a value of a coefficient due to a placement position of the temperature detection device as reference values, which are obtained by using said coefficient value acquiring unit in the individual body of the motor serving as a reference; and
   a temperature estimating unit for estimating a temperature of the motor based on the value of the coefficient, a reference value of the coefficient, the detection temperature acquired by the detection temperature acquiring unit, and the ambient temperature of the motor.

2. The temperature estimation apparatus according to claim 1, wherein the detection temperature acquiring unit acquires the detection temperature detected by the temperature detection device disposed in the motor including a cooling system.

3. The temperature estimation apparatus according to claim 1, wherein the detection temperature acquiring unit acquires the detection temperature detected by the temperature detection device disposed in a vicinity of a winding wire provided in the motor.

* * * * *